United States Patent
Kesting

[11] Patent Number: 5,695,012
[45] Date of Patent: Dec. 9, 1997

[54] ADJUSTABLE SUBSOILER WITH STAGED SHANKS

[75] Inventor: Lawrence W. Kesting, Oxrd, Ala.

[73] Assignee: Technical and Craft Services, Inc., Owen's Cross Roads, Ala.

[21] Appl. No.: 703,639

[22] Filed: Aug. 27, 1996

[51] Int. Cl.$^6$ .................................................. A01B 13/08
[52] U.S. Cl. ........................... 172/699; 172/271; 172/166
[58] Field of Search ............................... 111/123, 124, 111/126, 140, 148; 172/140, 146, 271, 196, 699, 700

[56] References Cited

U.S. PATENT DOCUMENTS

| | | | |
|---|---|---|---|
| 3,450,212 | 6/1969 | Sylvester | 172/699 |
| 3,684,030 | 8/1972 | Lucero | 172/700 |
| 3,952,490 | 4/1976 | Brockman | 172/354 X |
| 4,057,112 | 11/1977 | Taylor | 172/166 |
| 4,079,789 | 3/1978 | Bryd et al. | 172/699 X |
| 4,106,568 | 8/1978 | Cline | 172/699 X |
| 4,313,504 | 2/1982 | Fischer | 172/382 |
| 4,548,276 | 10/1985 | Linger | 172/699 X |
| 4,924,946 | 5/1990 | Dietrich, Sr. | 172/382 |
| 5,427,183 | 6/1995 | Parker | 172/265 |
| 5,437,337 | 8/1995 | Dietrich, Sr. | 172/196 |
| 5,462,123 | 10/1995 | Harlan et al. | 172/454 |
| 5,465,796 | 11/1995 | Buescher et al. | 172/762 |

*Primary Examiner*—Terry Lee Melius
*Assistant Examiner*—Robert Pezzuto

[57] ABSTRACT

A deep subsoiler (50) consists of a plurality of carriages (58) abreast on a frame (52) and a plurality of shanks (60) mounted on each of said carriages. The mounting for each of said shanks provides a fail-safe mechanism consisting of a pair of rosettes (72) with shear-bolts (86). Said rosettes enable the operator to minutely set an angle of attack for each shank tip (P37). Said carriages align parallel with a direction of travel. Each shank on the carriage functions at an increasing depth which provides a staged sequence with a shortest shank (60c) in a forward position. Theory and tests indicate a draft reduction using staged shanks. Said tips for these shanks produce larger voids in the subsoil and increase the flow of subsoil to the surface. Staged shank standards (P40) cut narrower grooves in the surface that inhibit rivulets. The larger voids hold more water and organic material and this material adheres better to the surface. The operator reduces draft further by monitoring tire load and adjusting angle of attack to prevent excessive slippage or draw-down on rear tractor wheels or gauge wheels. The structure also provides for shank spacing and adapts to prior art tip exchange.

12 Claims, 5 Drawing Sheets

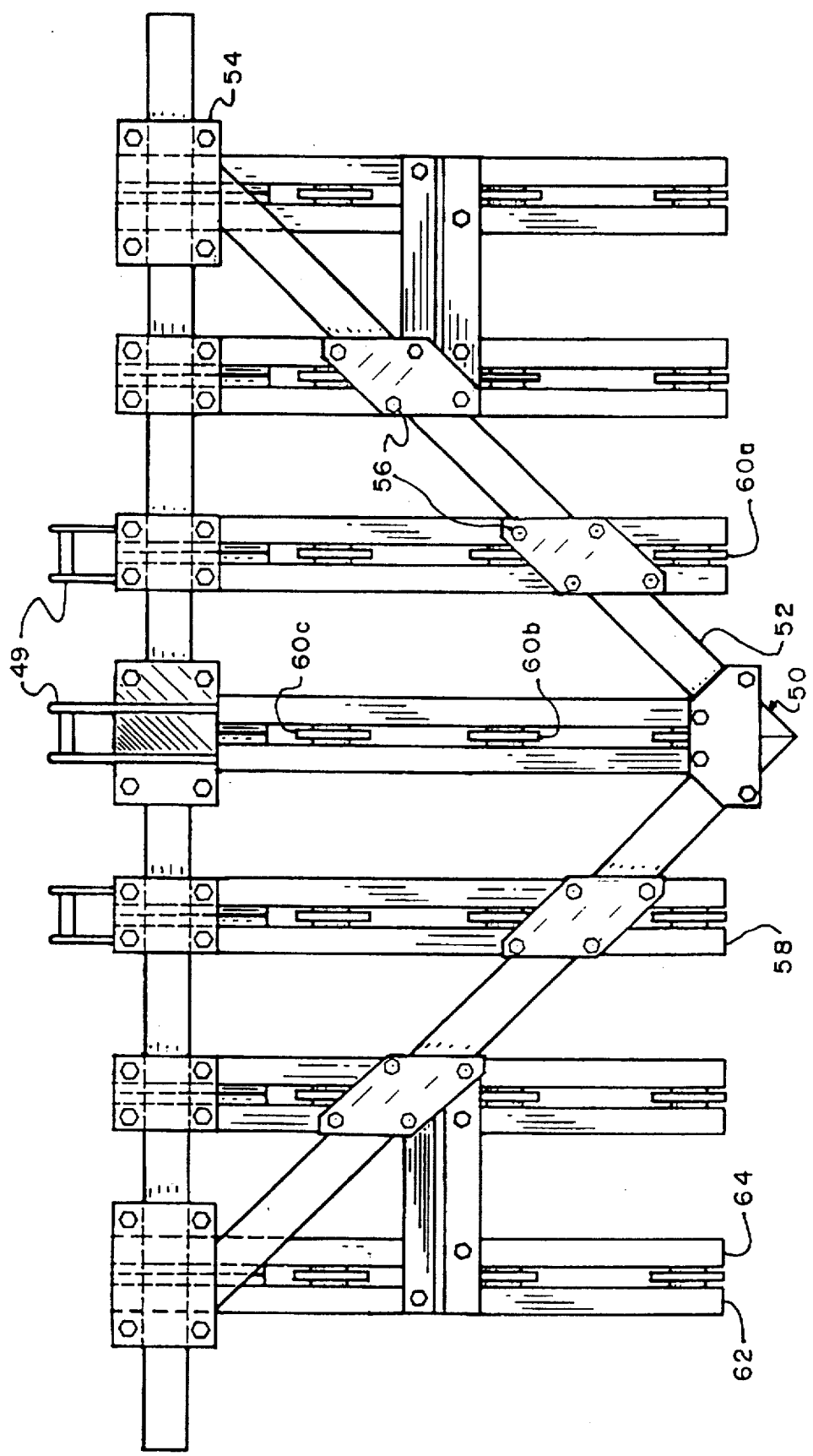

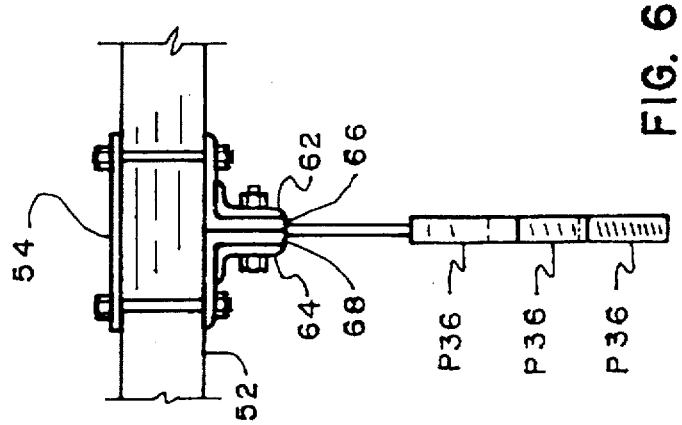
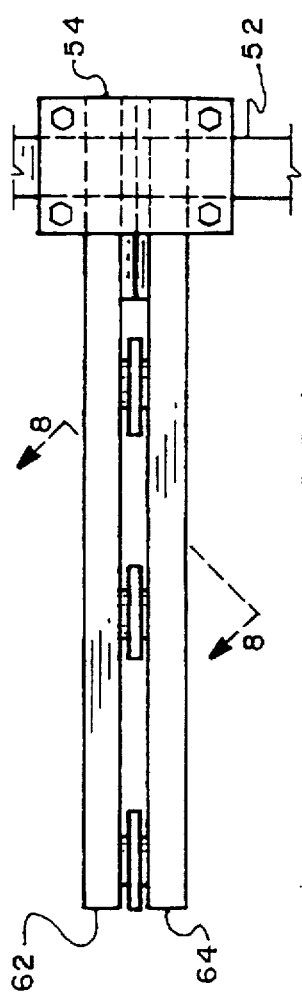
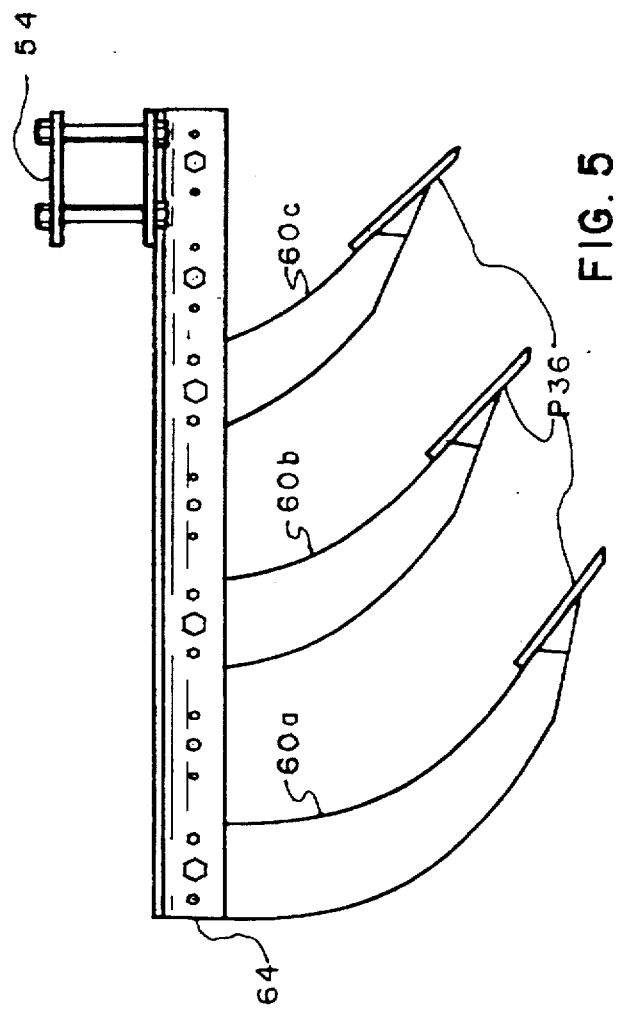

ADJUSTABLE SUBSOILER WITH STAGED SHANKS

FIELD

This invention relates to agricultural subsoilers, specifically to an improved orientation of shanks relative to the frame.

BACKGROUND

A new era was established in agriculture by the event of subsoiling. Ideally subsoiling yields many advantages for the farmer. It creates subterranean voids that fan out in a network of fissures. The surface disturbed by subsoiling should be free of continuous grooves and consist of small clods that span the the lateral distance between shanks. This soil condition provides a reservoir for water that would otherwise drain off top soil. The retained water contains dissolved and suspended organic material that sustain crops through longer periods of drought. The fissure networks provide channels for deep-rooted plants thereby improving crop yield. Obviously soil conversation is improved.

Unfortunately these ideal advantages are not fully realized using prior art equipment. The subterranean voids and fissures are small and easily recompacted. Therefore, the capacity to hold water is less and the time of retention of moisture is reduced. The ground surface between shanks is not adequately disturbed. The shank standards are heavy and thick due to the high draft required and often produce grooves in the surface that develop into rivulets. The draft required is exorbitant, approximately twice that needed for moldboard plowing, and, therefore, a serious threat to many individual economies.

Inventors have attempted to alleviate the problems for subsoilers, rippers, chisel plows, and mulchers since their inception in the early 1900's. The specific problems addressed herein pertain to draft required to pull shanks through soil at maximum depth and to soil break-up between shanks. U.S. Pat. No. 3,450,212, to Sylvester (1969) shows the typical configuration of a subsoiler with identical "C" shaped shanks mounted in a "V" formation. The coupling of each shank to the frame contains a fail-safe shear pin that sets the position of the shank relative to the frame. The patent exemplifies the basic components of simple, low cost subsoilers. The patent teaches that a "V" formation of an odd number of shanks requires less draft than an abreast formation citing subsoil breakup by the lead shank that extends laterally to shanks on the wings of the "V". This effect is highly dependent upon depth of cultivation and soil condition particularly moisture content. Also, shanks in a "V" formation do not operate at the same depth when angle of attack is changed by tilting the frame with a three point hitch. Therefore, either reduced quality of cultivation or increased draft must be accepted when tilting the frame. U.S. Pat. No. 5,427,183 to Parker (1995) shows a double spring, resetable coupling that trips under load to protect the shanks. The patent illustrates the complexity, weight, and bulk for this type of mechanism, which is used on more expensive subsoilers. U.S. Pat. No. 5,437,337 to Dietrich, Sr. (1995) shows interaction between a coulter and a shank that prevents furrows behind the shank thereby reducing rivulets. The device functions at depths too shallow for a subsoiler. U.S. Pat. No. 5,462,123 to Harlan, et al. (1995) shows a rectangular frame mounting subsoiler shanks with gangs of discs fore and aft. This machine reduces the number of passes over the field after subsoiling. It brings out the need to improve surface break-up. Since the discs do not interact with the shanks, the drag of the discs adds directly to the draft. U.S. Pat. No. 5,465,796 to Buescher and Bucker (1995) shows a method for mounting a variety of tips on subsoiler shanks. While in the field the operator can easily exchange tips. The patent does not provide for a change of tip intervals.

Although the search did not reveal any patents pertaining to agricultural subsoilers that reduce draft significantly, the excavating industry provided the following patents on processes that effect draft. U.S. Pat. No. 3,684,030 to Lucero (1972) shows apparatus for laying cable. It includes a trenching plow and a cable dispenser carried by a vertically adjustable support frame attachable to a self-propelled vehicle. The trenching plow consists of two or more teeth in a staged sequence that reduces draft and pulls the vehicle down against the surface. The apparatus functions at unacceptable speeds for agricultural purposes. U.S. Pat. No. 4,313,504 to Fischer (1982) shows a large crawler tractor pulling a ripper assembly that loosens earth to a depth of one meter or more. The assembly consists of two straight shanks that are perpendicular to the ground and tandemly oriented. The lead shank functions at approximately onehalf of the depth of the trailing shank. A specifically designed tractor hitch mounts at least three assemblies abreast and separately manipulates each row of shanks for cleaning. The invention is directed toward insuring that the shanks will not become unduly clogged during operation. The patent claims a reduction in draft for pulling the ripper assembly through hard packed soil at depths of one to two meters. Since the reduction is based upon the theory that draft is proportional to the square of the depth of cut, the patent states in effect that the force to pull a tandem assembly of two shanks, one at twice the depth of the other, is onehalf the draft to pull a single shank at the depth of the long shank in the tandem assembly. The patent supports the feasibility of staging to reduce draft in soil loosening machines for excavating, but its structure prohibits consideration for agriculture. U.S. Pat. No. 4,924,946 to Dietrich, Sr. (1990) shows an apparatus for plowing highly compacted soil to a depth of one to two meters. Two point plows and a parabolic shank with a broad tip, called a deep-point plow, function in a staged relationship. The two point plows are located forward, to the left, and at onehalf the depth relative to the deep-point plow. The advantage claimed for the invention pertains to less energy for raising the soil by the deep-point plow. The soil breakup pattern and power required for draft appear unacceptable for agricultural purposes.

The concept of draft as a function of soil depth squared, which is the basis for staging, deserves more attention. The soil mechanics discipline abounds in equations containing depth squared terms. For example, foundation engineers have used equations by Rankine to design earth anchors similar to subsoilers shanks. However, this procedure recommends notoriously high safety factors, namely at least three for earth anchors in clay, which impares confidence when applied to agriculture.

Attempts to adapt staged shanks to agricultural subsoilers raises at least three questions. Will the clogging friction and form drag of additional shanks in a staged sequence offset any gains from staging? This can be determined with acceptable confidence only by extensive testing. Tests that I completed clearly showed a draft reduction of 20 to 30 per cent for staged shanks and were obviously extensive enough to warrant a patent. However, the tests showed that staged shanks are more sensitive to angle of attack than a single, deep shank. Staged shanks require a minute setting of angle of attack at each stage for small changes in soil condition.

This poses the second question; namely, can means for changing angle of attack for each shank in a staged sequence be designed? The third question deals with the problem of protecting staged shanks when striking submerged objects. Is a fail-safe mechanism possible within the confined envelopment for mounting staged shanks on a frame? The prior art offers no precedence for these problems.

OBJECTS

Accordingly an object of my invention is to provide an agricultural subsoiler with staged shanks.

A further object is to provide a mechanism for minutely adjusting the angle of attack of the tip for each shank in a staged sequence.

A third object is to provide a mechanism for mounting each shank in a staged sequence on a frame to allow each shank to swing away from submerged objects that would otherwise damage it.

A fourth object is to provide a subsoiler that can be modified by the user to optimize draft and quality in accordance with the user's economy. More specifically this object includes a subsoiler that can be modified in the field by the operator to reduce draft and improve quality of soil break-up when employing staged shanks.

A fifth object is to produce deep subsoiling with break-up at the surface that contains smaller clods and deeper, more discontinuous voids than are presently obtained.

A sixth object is to provide for the use of a variety of shanks and tips for subsoiling that can be mounted in various arrangements on a frame so that depth of penetration and angle of attack relative to the soil are adjustable, particularly for optimizing tire load and quality of soil break-up.

A seventh object is to increase the range of penetration of shanks into the soil.

DRAWING FIGURES

In the drawings numbers for prior art parts are prefaced by the letter "P".

FIG. 4 shows a top view of FIG. 3.

FIG. 5 shows the staged shank sequence.

FIG. 6 shows a right end view of FIG. 5.

FIG. 7 shows a top view of FIG. 5.

REFERENCE NUMERALS

Figure 1:
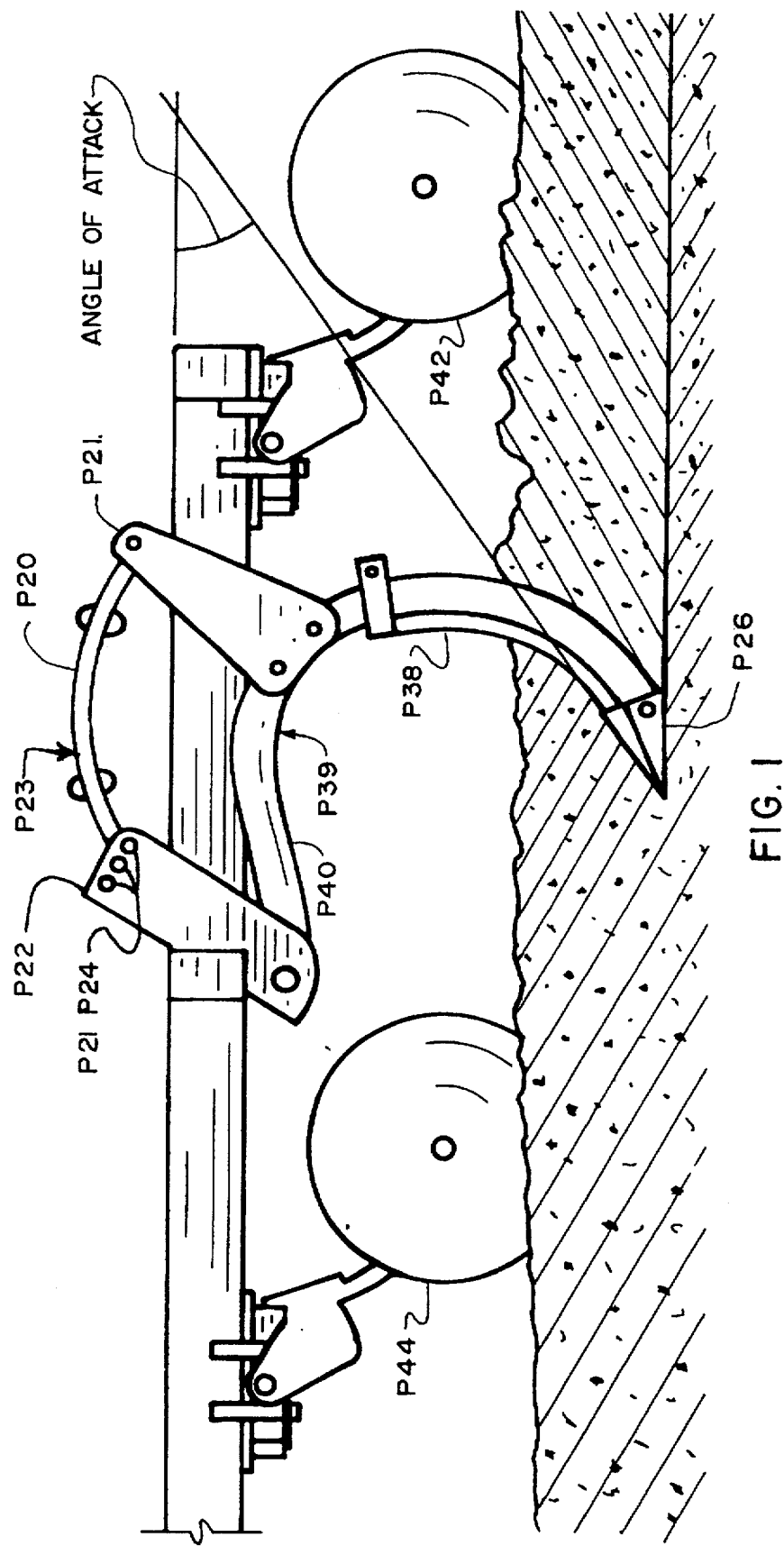
FIG. 1 shows a prior art subsoiler with gangs of discs.

| REFERENCE NUMERALS |   |
| --- | --- |
| P20 | Leaf Spring |
| P21 | Coupling Bracket |
| P22 | Coupling Boss |
| P23 | Fail-Safe Leaf Coupling |
| P24 | Leaf Spring Mounting Holes |
| P26 | Breaker Tip |
| P28 | Winged Tip |
| P30 | Shovel Tip |
| P32 | Spear Tip |
| P34 | Sweet Tip |
| P36 | Chisel Tip |
| P37 | General Tip |

-continued

| REFERENCE NUMERALS | |
| --- | --- |
| P38 | Shin Guard |
| P39 | Prior Art Shank |
| P40 | Standard |
| P42 | Rear Disc Gang |
| P44 | Front Disc Gang |
| P46 | Tractor |
| P48 | Three Point Tractor Hitch |
| 49 | Three Point Receiving Hitch |
| 50 | Subsoiler |
| 52 | Triangular Frame |
| 54 | Gusset Plate |
| 56 | Bolt With Nuts |
| 58 | Carriage |
| 60 | General Shank |
| 60a | Rear Shank |
| 60b | Center Shank |
| 60c | Front Shank |
| 62 | Carriage Angle |
| 64 | Opposite Carriage Angle |
| 66 | Short Angle |
| 68 | Opposite Short Angle |
| 70 | Drilled Holes |
| 72 | Rosette |
| 74 | Opposite Rosette |
| 76 | Forward Tapped Hole |
| 78 | Opposite Forward Tapped Hole |
| 80 | Rearward Tapped Hole (not shown) |
| 82 | Opposite Rearward Tapped Hole |
| 84 | Four Counter-Bored Holes (Three Not Shown) |
| 86 | Shear-Bolt |
| 88 | Center-Bolt |
| 90 | Center Bolt Nut |

STRUCTURE

The general structure of my subsoiler will be better understood after a brief review of the prior art machine shown in FIG. 1. This machine is shown in detail in U.S. Pat. No. 5,462,123 to Harlan, et al, (1995) and referenced in the background discussion. Front and rear gangs of discs, P44 and P42, support a frame that mounts a typical shank P39 composed of a standard P40, a shin guard P38 and a tip P26. These parts should be regarded as optional for my subsoiler. A fail-safe coupling P23 made up from a bracket P21 and a leaf spring P20 can be mounted on coupling boss P22 at one of three locations P24 to yield a coarse, limited adjustment for angle of attack.

Figure 3:
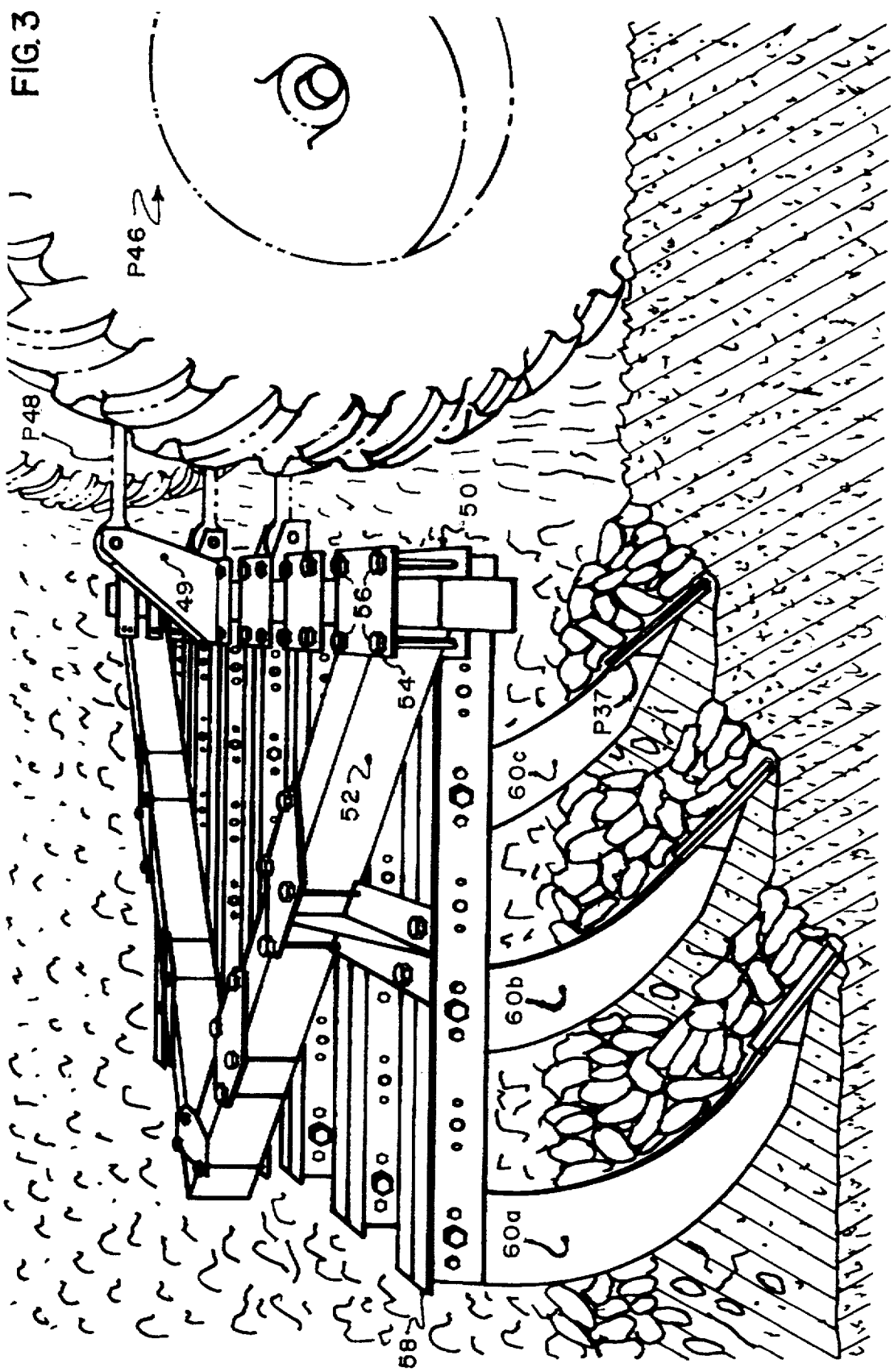
FIG. 3 shows the invention in operation.

The structural description of my subsoiler begins in FIG. 3. A prior art tractor P46 connects via three point tractor hitch P48 to a subsoiler 50 with a triangular frame 52. A plurality of gusset plates 54 each with bolts and nuts 56 secure a plurality of carriages 58 to frame 52. Each carriage supports a plurality of shanks 60a, 60b, and 60c in a staged sequence. Manufacturers often make frames similar to frame 52 by welding sections of 5×7 inch (12×17 cm) steel tubing.

FIG. 4 which is a top view of FIG. 3 shows the transverse spacing of carriages 58. Using different mounting holes for bolts 56 carriages 58 can be grouped transversely at several spacings. Bosses on frame 52 provide mountings for gauge wheels not shown.

FIGS. 5, 6, and 7 show front, end, and top views of carriage 58. Pairs of structural steel angles called a carriage angle 62 and an opposite carriage angle 64 make up carriage 58. Short angles 66 and opposite short angles 68 reinforce and space angles 62 and 64 at their attachment to frame 52.

Figure 8:
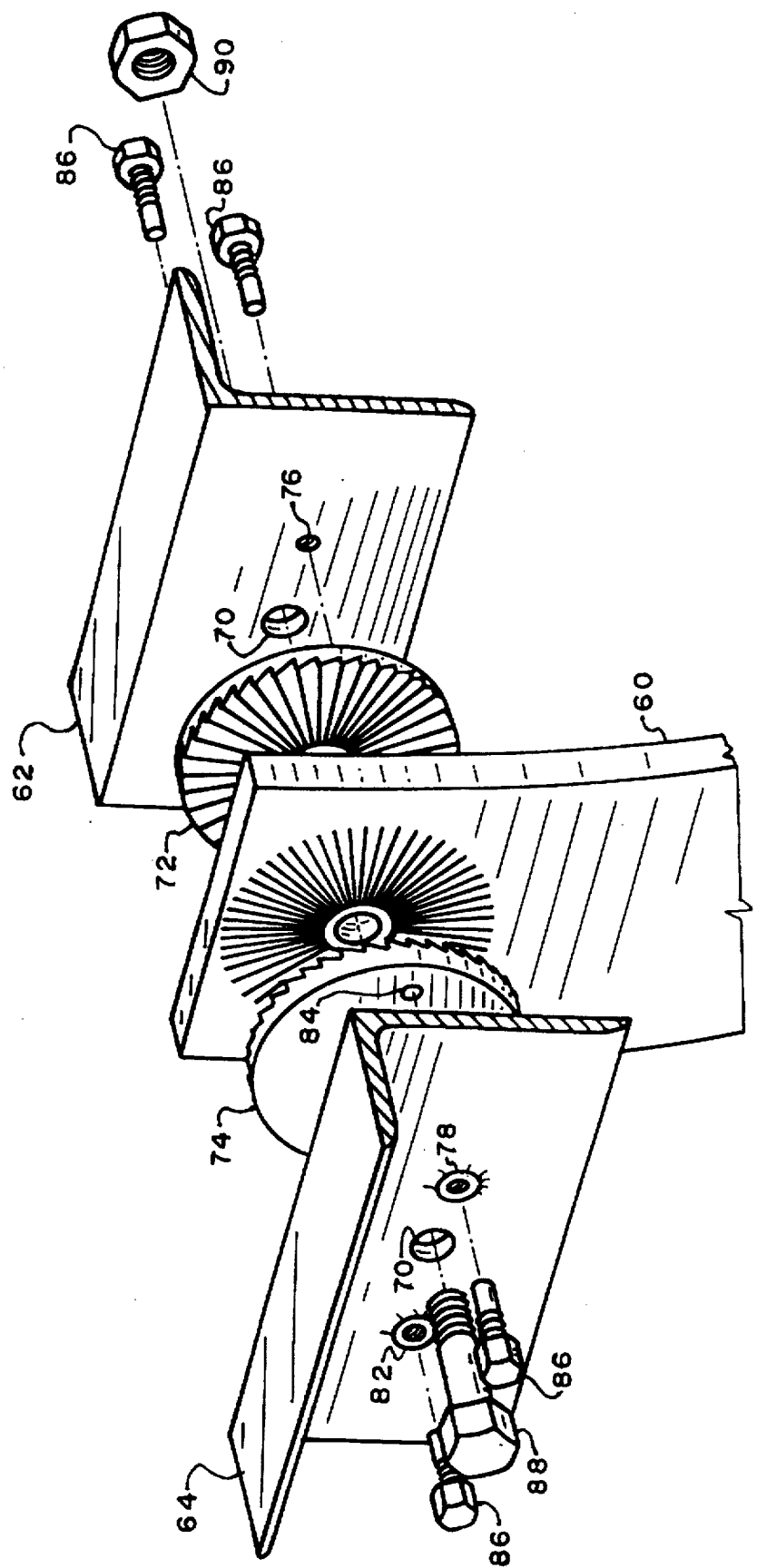
FIG. 8 shows details of a fail-safe coupling as section 8—8 of FIG. 7.

FIG. 8 shows an exploded view of a point of attachment of shank 60 to carriage 58 as oriented from section 8—8 in FIG. 7. A drilled hole 70 at the point of attachment pervades carriage angles 62 and 64, rosettes 72 and 74, and shank 60.

Four identically tapped holes 76, 78, 80, and 82 enter angles 62 and 64 so that unthreaded ends of bolts 86 enter each counterbored hole 84 in rosettes 72 and 74. A center bolt 88 with nut 90 draws the assembly together so that shank 60 is prevented from rotating by the serrations in rosettes 72 and 74. Shear-bolts 86, of course, prevent rosettes 72 and 74 from rotating relative to carriage angles 62 and 64.

Figure 2:
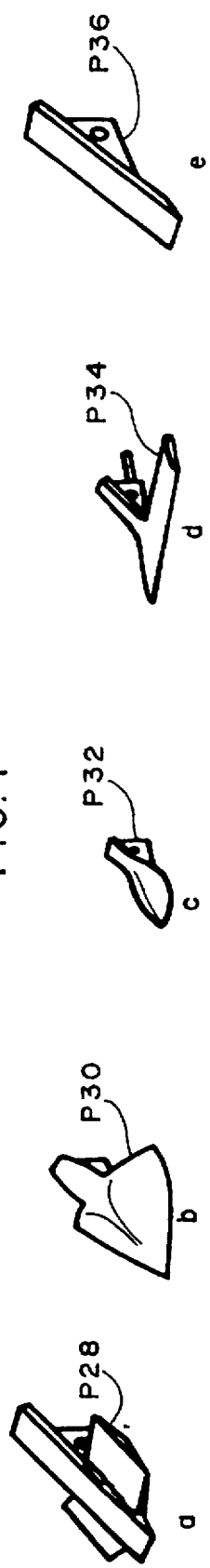
FIG. 2 shows examples of prior art shank tips.

My subsoiler provides several options that can be combined with actions of three point tractor hitch P48 to yield structural versatility. FIGS. 3 and 4 show that the number and spacing of carriages 58 on frame 52 are variable and the number and spacing of shanks 60a,b,c on single carriage 58 are also variable. Furthermore, the breadth and style of shank tips are selectable. The market offers a wide variety of tips for surface mulching and subsoiling at all levels. For example FIG. 2 shows tips P26, P28, P30, P32, P34, P36, which can be obtained from several manufacturers including Deere and Company John Deere Road, Moline, Ill. 61265. The options provided are described in more detail in the operational description.

OPERATION

Before operating my subsoiler a typical farmer would recall his experience on the economy of the pending application. A preliminary specification would emerge to be verified by trial runs. The farmer would specify: the number and spacing of carriages 58 on frame 52; the number and spacing of shanks 60 on each carriage 58; the tip on each shank 60; the angle of attack; the depth of penetration of each tip into the soil; and the functional range of three point hitch P48 on tractor P46. Hitch P48 elevates and tilts frame 52 over functional ranges usually set by turnbuckles. Within a given range sensors respond, for example, to pressure in hydraulic cylinders to automatically control the position of frame 52 relative to the surface being worked. Manufacturer's literature, available, for example, at Farmer's Tractor Company 6333 University Drive NW, Huntsville, Ala. 35806, describes details of three point hitches. After the preliminary specification is implemented, the farmer would make trial runs.

The trial runs must supply sufficient data to at least appraise break-up of the soil at the surface, tire load, and fuel consumption. Data available from direct observation is usually sufficient, but the use of sophisticated instrumentation is often justified in large scale operations.

Quality subsoiling requires that shank tips reach specified depths and that fissures in the soil fan out to the surface. These fissures provide channels for entrapment of air and water with suspended and dissolved organic matter. The tips should loosen earth rather than compact it. The shank leading edge assisted by a shin guard should elevate this loosened earth to the surface to provide subterranean space for holding organic material from the surface. Furthermore, this upheaval must eliminate grooving at the surface caused by the breadth of shanks 60. The fissures should span the interval between carriages 58 and provide a uniformly rough surface.

The sum of the weights on the tractor rear wheels and a positive or negative vertical force caused by the action of the subsoiler produce tire load. Tire load that is too light or too heavy increases fuel consumption. If it is light, the tire slips more on the ground. If it is heavy, the tractor wheels impress excessive tread depths in the earth and do useless vertical work in compressing the tires over each new contact area with the ground as the tire rolls. This draw-down and slippage cause energy losses that must be paid for by extra fuel consumption.

A fuel consumption rate can, of course, be determined by topping off the fuel tank to the same level and dividing the quantity added by the time or distance from the previous filling. Refinements are possible by considering atmospheric temperature, pressure, and humidity; tractor idle time; slope of terrain; and other data.

My subsoiler provides several options for improving performance observed in trial runs. Most of the options depend upon angle of attack as defined in FIG. 1. This angle can be changed in the field by loosening nut 90 shown in FIG. 8, swinging shank 60 about bolt 88 to the desired angle of attack, and retightening nut 90. The options recommended in some cases interact and, therefore, require an overall monitoring.

(1.) If an excessively long run is required to submerge the shanks to a specified operating depth, the operator adjusts angle of attack particularly for rear shank 60a and center shank 60b. He decreases the angle if the subsoiler bounces in and out of the ground before finally entering. He increases the angle if entry occurs after a long glide. The operator should first exhaust the limits of three point tractor hitch P48, then make permanent adjustments of attack angle.

(2) If depth of penetration of shanks into the ground does not meet specifications the operator should first adjust the functional setting of three point tractor hitch P48 to raise or lower subsoiler 50 relative to tractor P46. Then he adjusts the angle that carriages 58 make with the ground using turnbuckles for hitch P48.

(3) If soil surface after subsoiling does not meet specifications, the operator adjusts angle of attack for shank 60c, spacing between carriages 58, and as a last resort replaces the tip on shank 60c.

(4) If tires are improperly loaded by the action of subsoiler 50, the operator increases angle of attack to decrease tire load and vise versa. Improper loading of tires by a subsoiler or any other implement is difficult but not impossible to detect. When the tractor is stopped, the stresses on tires and soil are relieved in a few seconds due to settling. Therefore, static measurements are unreliable. However, delicate sensors can be installed by those skilled in this art to detect over or under tire load when the tractor is working.

After the above options are implemented, fuel consumption and quality of output should be compared to previous data to appraise the effects of the adjustments. Experience with this equipment in a familiar environment on land that is well known will bring out many advantages.

ADVANTAGES

My subsoiler responds to the objects previously listed in that staged shanks, each with fail-safe protection, can be varied in angle of attack and position relative to a frame. Performance objects are met by an increased volume for voids in the subsoil and a discontinuous break-up of the surface that minimizes rivulets.

My subsoiler reduces draft by two methods. The movement of carriages 58 by three point tractor hitch P48 and the settings of shanks 60 on rosettes 72 enable the user to set an optimum angle of attack of the shank tip over a wide range. This angle determines draw-down or climb-out of the subsoiler which over or under loads the tractor or gauge wheel tires. Either condition increases fuel consumption. Since prior art equipment does not have this refinement, my design will improve the subsoiling economy even though a single shank is employed. When a plurality of shanks is employed in a staged sequence as shown in FIGS. 3, 5, and 6, theory and tests indicate a further draft reduction is possible. The front shank 60c in the figures primarily breaks up the surface, although a staging effect is obvious.

The carriages with staged shanks yield higher quality at the surface and in the subsoil compared to single shanks in the prior art. Tips on shanks following the lead shank attack the subsoil with numerous strategies, such as wide tips to make under ground grooves that store more organic material or hard, narrow tips to work through gravel and force it upward. Staged shanks obviously attack soil at a shallower depth than a single shank. The stages tips, therefore, dislodge more soil instead of compressing it against the sides and bottom of the groove. The dislodged soil forces previously dislodged soil upward in the groove creating flow to the surface. Since at least two tips are working the same groove at different depths, the groove is approximately double that created by a single tip. This increases the capacity of the groove to hold water and organic material. This advantage prevails in the subsoil. At the surface the opposite occurs. There staged shanks cut a groove that is narrower than the cut by a single shank of the prior art. For example assume that two shank standards in a staged sequence resist 80 per cent of the load on a single, unstaged shank due to the advantage of staging. If each of the two standards carries half of this load or 40 per cent, each standard need be no more than 40 per cent of the width of the standard for the single shank. Other conditions, of course, must be considered such as flexibility and stress concentrations, but a significant reduction in continuous grooving at the surface, which leads to rivulets, can be expected with stage shanks. Break-up of both the subsoil and the surface is obviously superior using these techniques.

A major advantage develops from the wide range of shanks, tips, and other implements that can be adjusted and installed by the user to improve performance. The number and lateral spacing of carriages 58 and number and longitudinal spacing of shanks 60 on each carriage 58 varies. In the field the operator easily adjusts angle of attack and exchanges tips on shank 60. Carriage 58 in cooperation with three point tractor hitch P48 lowers rear shank 60a into the ground over an increased range of penetration.

The advantages of my subsoiler are attained apparently without trade-offs. The structure remains simple without additional controls beyond the prior art. Although some adjustments are intricate, they provide an interesting challenge to farmers for optimizing special situations.

SCOPE

Although the description above contains many specificities, these should not be construed as limiting the scope of the invention but as merely providing illustrations of some of the presently preferred embodiments of this invention. For example, the carriage can have other shapes, such as greater length to support other implements that could prevent clogging of the shanks.

Thus the scope of the invention should be determined by the appended claims and their equivalents, rather than by the examples given.

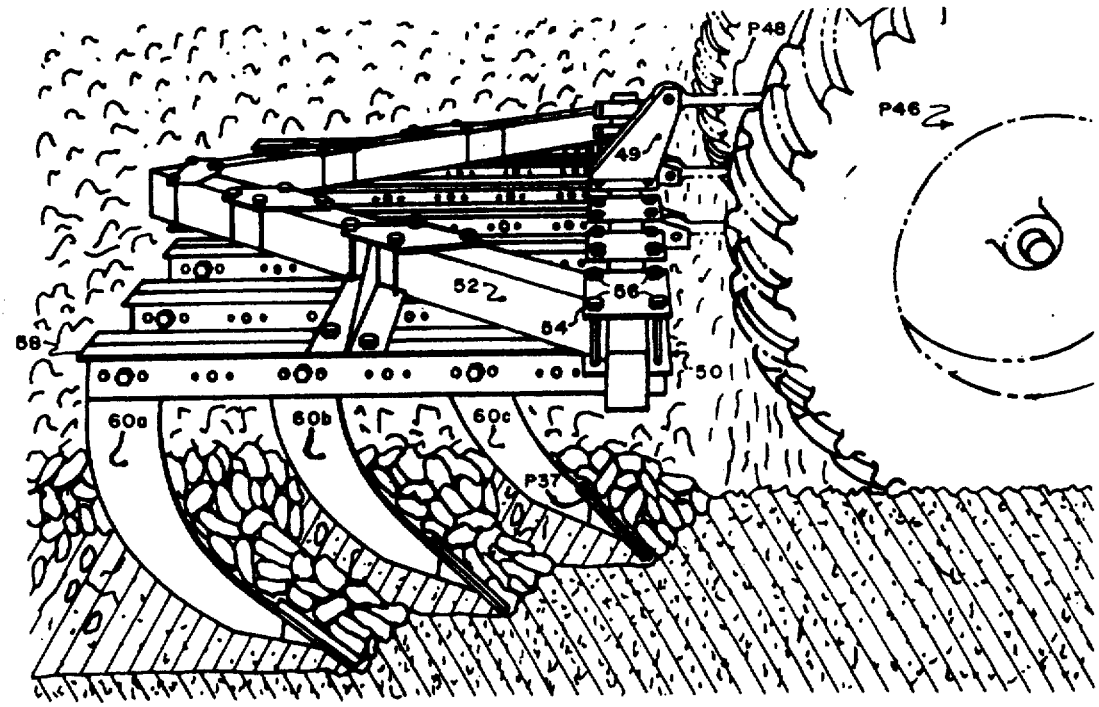

I claim:

1. An agricultural subsoiler, comprising:
   a. a frame;
   b. a plurality of carriages mounted on said frame so that a longitudinal axis for each carriage is parallel to a working direction of travel of the frame;
   c. a plurality of shanks mounted on each carriage of said plurality of carriages to create a plurality of sets of shanks so that each shank of said plurality of sets functions in a staged sequence and supports the frame by penetrating a soil surface wherein each carriage of the plurality of carriages includes a bolt and nut means for mounting said plurality of shanks in said staged sequence on at least a single carriage angle at a predetermined angle of attack and for longitudinal and vertical spacing between the shanks; and
   d. a hitch mounted on the frame to receive a force from a tractor in said working direction of travel sufficient to draw the plurality of sets of shanks when penetrating said soil surface thereby producing a predetermined subsoil and surface soil cultivation; and
   e. at least a single angularly adjustable rosette.

2. The agricultural subsoiler of claim 1 wherein the frame is a triangular frame.

3. The agricultural subsoiler of claim 1 wherein each carriage of the plurality of carriages is at least said single carriage angle with a gusset plate both with holes to receive a set of bolts and nuts for mounting the plurality of carriages on the frame at a predetermined transverse and longitudinal spacing.

4. The agricultural subsoiler of claim 1 wherein said bolt and nut means comprises a center-bolt and a nut and at least a single shear bolt; whereby said center-bolt passes through a drilled hole in the carriage angle and an aperature at the center of said single rosette, then through a hole in a standard, and finally into said nut that draws the bolt and nut means together; and thus setting said predetermined angle of attack, guiding said single shear-bolt into a counterbored hole in the single rosette, and thereby enabling said standard to rotate away from an obstacle that causes rupture of the shear-bolt.

5. The agricultural subsoiler of claim 1 wherein said staged sequence comprises at least a front shank and at least a rear shank whereby said front shank cuts a groove in the soil surface and works an upper increment of soil using a front tip; and is followed in said groove by said rear shank that deepens the groove and works a lower increment of soil using a rear tip.

6. The agricultural subsoiler of claim 1 wherein said hitch comprises a three point receiving hitch.

7. A method for agricultural subsoiling comprising the steps of:
   a. assembling a frame;
   b. mounting a plurality of carriages on said frame so that a longitudinal axis for each carriage is parallel to a working direction of travel of the frame;
   c. mounting a plurality of shanks on each carriage of said plurality of carriages to create a plurality of sets of shanks so that each shank of said plurality of sets functions in a staged sequence and supports the frame by penetrating a soil surface wherein each carriage of the plurality of carriages includes at least an adjustable rosette, a bolt and nut means for mounting said plurality of shanks in said staged sequence on at least a single carriage angle at a predetermined angle of attack and for longitudinal and vertical spacing between the shanks; and
   d. hitching the frame to a tractor to receive a force in said working direction sufficient to draw the plurality of sets of shanks when penetrating said soil surface thereby producing a predetermined subsoil and surface soil cultivation.

8. The method for agricultural subsoiling in claim 7 wherein assembling the frame is assembling a triangular frame.

9. The method for agricultural subsoiling in claim 7 wherein mounting the plurality of carriages on the frame is mounting at least said single carriage angle and a gusset plate both with holes to receive a set of bolts and nuts for mounting the plurality of carriages on the frame at a predetermined transverse and longitudinal spacing.

10. The method for agricultural subsoiling in claim 7 wherein mounting said bolt and nut means is passing a center-bolt through at least the single carriage angle, at least the single rosette, a standard, and into a center-bolt nut that draws the bolt and nut means together, thereby setting the shank at a minutely predetermined angle of attack and permitting the shank to rotate when the shank encounters a resistance in said cultivation sufficient to shear a set of shear-bolts acting between said single rosette and the single carriage angle.

11. The method for agricultural subsoiling in claim 7 wherein mounting the plurality of shanks to function in said staged sequence is mounting at least a front shank that cuts a groove in the soil surface and works an upper increment of soil using a front tip and is followed in said groove by at least a rear shank that deepens the groove and works a lower increment of soil using a rear tip.

12. The method for agricultural subsoiling in claim 7 wherein hitching the frame to said tractor comprises mating a three point receiving hitch with a three point tractor hitch.

* * * * *

UNITED STATES PATENT AND TRADEMARK OFFICE
CERTIFICATE OF CORRECTION

PATENT NO. : 5,695,012

DATED : Dec. 9, 1997

INVENTOR(S) : Lawrence W. Kesting

It is certified that error appears in the above-identified patent and that said Letters Patent is hereby corrected as shown below:

The title page, showing the illustrative figure, should be deleted and substitute therefor the attached title page.

Signed and Sealed this

Third Day of March, 1998

*Attest:*

BRUCE LEHMAN

*Attesting Officer*      Commissioner of Patents and Trademarks

United States Patent [19]

Kesting

[11] Patent Number: 5,695,012
[45] Date of Patent: Dec. 9, 1997

[54] ADJUSTABLE SUBSOILER WITH STAGED SHANKS

[75] Inventor: Lawrence W. Kesting, Oxrd, Ala.

[73] Assignee: Technical and Craft Services, Inc., Owen's Cross Roads, Ala.

[21] Appl. No.: 703,639

[22] Filed: Aug. 27, 1996

[51] Int. Cl.⁶ .................................. A01B 13/08
[52] U.S. Cl. .................. 172/699; 172/271; 172/166
[58] Field of Search .......................... 111/123, 124, 111/126, 140, 148; 172/140, 146, 271, 196, 699, 700

[56] References Cited

U.S. PATENT DOCUMENTS

| | | | |
|---|---|---|---|
| 3,450,212 | 6/1969 | Sylvester | 172/699 |
| 3,684,030 | 8/1972 | Lucero | 172/700 |
| 3,952,490 | 4/1976 | Brockman | 172/354 X |
| 4,057,112 | 11/1977 | Taylor | 172/166 |
| 4,079,789 | 3/1978 | Bryd et al. | 172/699 X |
| 4,106,568 | 8/1978 | Cline | 172/699 X |
| 4,313,504 | 2/1982 | Fischer | 172/382 |
| 4,548,276 | 10/1985 | Linger | 172/699 X |
| 4,924,946 | 5/1990 | Dietrich, Sr. | 172/382 |
| 5,427,183 | 6/1995 | Parker | 172/265 |
| 5,437,337 | 8/1995 | Dietrich, Sr. | 172/196 |
| 5,462,123 | 10/1995 | Harlan et al. | 172/454 |
| 5,465,796 | 11/1995 | Buescher et al. | 172/762 |

*Primary Examiner*—Terry Lee Melius
*Assistant Examiner*—Robert Pezzuto

[57] ABSTRACT

A deep subsoiler (50) consists of a plurality of carriages (58) abreast on a frame (52) and a plurality of shanks (60) mounted on each of said carriages. The mounting for each of said shanks provides a fail-safe mechanism consisting of a pair of rosettes (72) with shear-bolts (86). Said rosettes enable the operator to minutely set an angle of attack for each shank tip (P37). Said carriages align parallel with a direction of travel. Each shank on the carriage functions at an increasing depth which provides a staged sequence with a shortest shank (60c) in a forward position. Theory and tests indicate a draft reduction using staged shanks. Said tips for these shanks produce larger voids in the subsoil and increase the flow of subsoil to the surface. Staged shank standards (P40) cut narrower grooves in the surface that inhibit rivulets. The larger voids hold more water and organic material and this material adheres better to the surface. The operator reduces draft further by monitoring tire load and adjusting angle of attack to prevent excessive slippage or draw-down on rear tractor wheels or gauge wheels. The structure also provides for shank spacing and adapts to prior art tip exchange.

12 Claims, 5 Drawing Sheets